Dec. 24, 1968    M. H. PELAVIN    3,418,053
COLORIMETER FLOW CELL
Filed Aug. 28, 1964
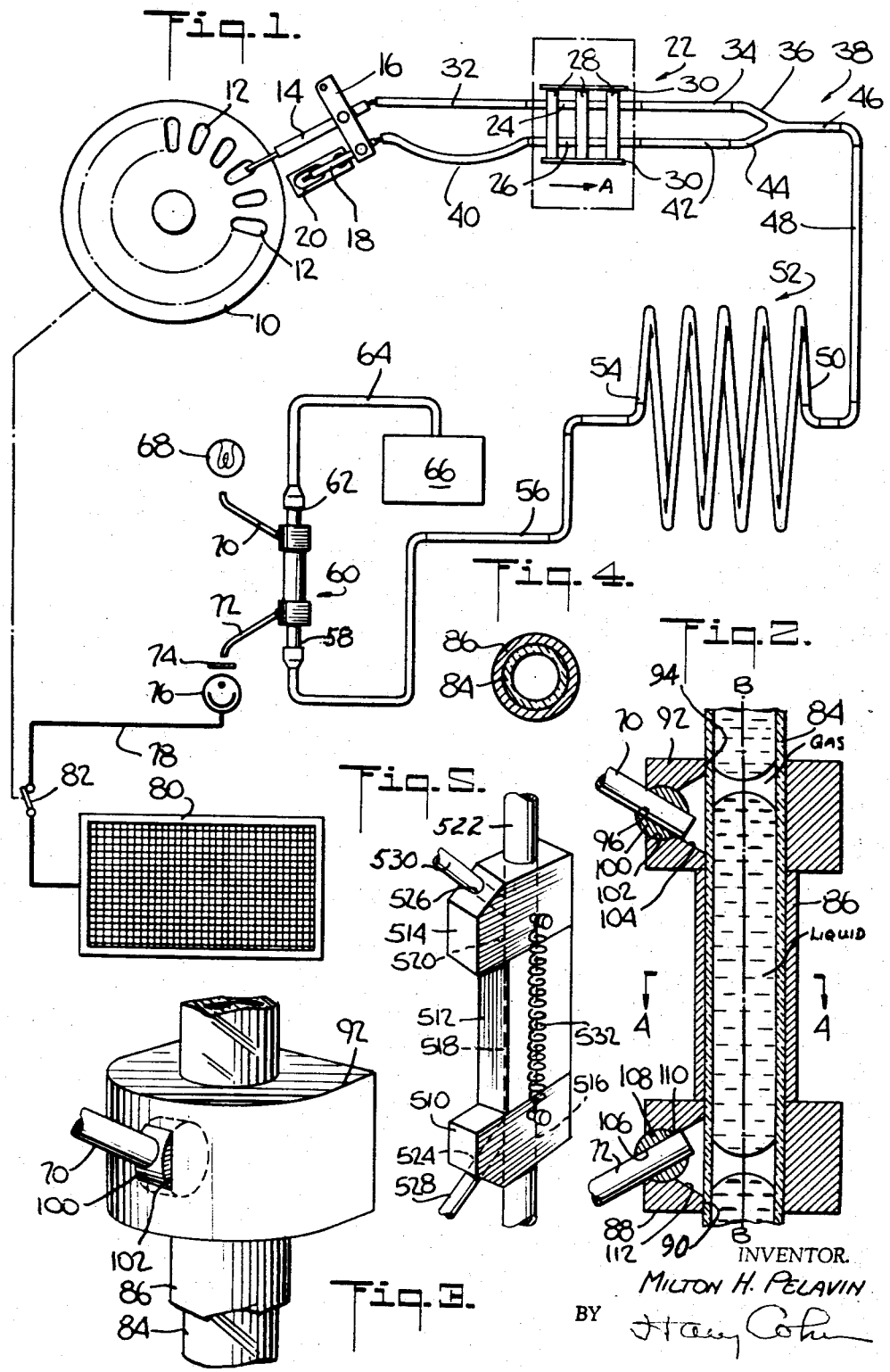
INVENTOR.
MILTON H. PELAVIN
BY
ATTORNEY

United States Patent Office 3,418,053
Patented Dec. 24, 1968

3,418,053
COLORIMETER FLOW CELL
Milton H. Pelavin, Greenburgh, N.Y., assignor to Technicon Instruments Corporation, Chauncey, N.Y., a corporation of New York
Filed Aug. 28, 1964, Ser. No. 392,692
2 Claims. (Cl. 356—181)

ABSTRACT OF THE DISCLOSURE

A flow cell assembly for a colorimeter comprises a vertical conduit, a first bundle of light conducting fibers which is adjustable with respect to angle to and location along the conduit for inserting light into the conduit, and a second bundle of light conducting fibers which is adjustable with respect to angle to and location along the conduit for receiving light from the conduit. The bundles are spaced apart by a tube having an inner reflecting surface.

---

This invention relates to apparatus for automatic quantitative analysis of unique liquid sample segments flowing seriatim in a continuous stream and particularly to an improved flow cell for colorimetric analysis of very small flowing volumes.

In the automatic analysis of liquids, such as is taught in the patent to Leonard T. Skeggs, U.S. 2,797,149 issued June 25, 1957, a liquid stream consisting of a seriatim flow of unique liquid sample segments spaced apart by gas segments and including intermediate gas bubbles is treated by a continuous flow of suitable reagents, and otherwise suitable further treated, to the result that a color reaction is produced in the sample, the optical density of which at a given wave length bears a predetermined relationship to the content of an ingredient in the original sample. The colored samples in a continuous stream are passed through a flow cell which is in the path of light beam of known wave length and intensity, and any change in the light beam is measured and recorded and provides a positive measurement of the content of the ingredient of interest in the original sample. It may be noted that the intermediate bubbles in each sample segment are provided to scrub the interior of the tubing of the system to preclude contamination between samples.

It is an object of this invention to provide a flow cell requiring a minimum volume of liquid sample, with a smooth, continuous inner surface without any discontinuities which might retard liquid or air from a preceding sample into a succeeding sample.

It is another object of this invention to provide a measuring beam of light longitudinally through a flow cell with a smooth continuous surface.

It is still another object of this invention to provide a flow cell wherein the length of the path through the sample of the measuring light beam may be selectively varied.

It is yet another object of this invention to provide a tube type flow cell providing a path through the sample for a measuring light beam which is greater than the rectilinear dimension of the tube between the light beam input and output.

A feature of this invention is the provision of a flow cell comprising a vertically disposed tube of nonwetting material, through which tube a measuring light beam is passed at an angle to the diameter of the tube, and received at an angle to the diameter of the tube for measurement.

The above and other objects, features and advantages of the invention will be made clear by the following detailed description thereof taken in conjunction with the accompanying drawings wherein:

FIG. 1 is a diagrammatic plan of an automatic analysis apparatus incorporating the flow cell and the light beam apparatus of this invention.

FIG. 2 is a front view in axial cross-section of a flow cell and light beam apparatus embodying this invention;

FIG. 3 is a perspective view of a portion of the structure of FIG. 2 showing the coupling of the light beam apparatus to the flow cell;

FIG. 4 is a transverse cross-section of FIG. 2 taken along line 4—4; and

FIG. 5 is a perspective view of a simplified embodiment of a flow cell embodying this invention.

Turning now to the drawings, a carrier 10 supporting a plurality of cups 12, each of which contains a unique sample liquid, is periodically incrementally rotated by means, not shown, to position one cup adjacent a liquid take-off tube 14. This first take-off tube is mounted on a rocker arm assembly 16 which is coupled to the carrier rotating means by linkage, not shown, to dispose the end of the take-off tube in the adjacent cup and to withdraw the tube when a fresh sample is to be rotated into position. This hereinabove described apparatus is shown in the Isreeli et al. patent application Ser. No. 284,718, filed May 31, 1963 and assigned to the assignee of this application. A second liquid take-off tube 18 is also mounted to the rocker arm assembly 16 and is concurrently disposed in a constant level well 20 containing a reagent liquid.

A proportioning pump 22 has a plurality of resilient pump tubes 24 and 26 mounted therein, and has a plurality of rollers 28 mounted between two continuous chains 30 which progressively occlude the pump tubes to provide proportional volumetric rates of flow of liquid through the pump tubes. The proportioning pump assembly may advantageously be of the type shown in the Ferrari, Jr., et al. patent, U.S. 2,935,028, issued May 3, 1960.

The pump tube 24 is coupled by a tube 32 to the outlet end of the first take-off tube 14 and by a tube 34 to an inlet leg 36 of a junction conduit 38. The pump tube 26 is coupled by a tube 40 to the outlet end of the second take-off tube 18 and by a tube 42 to an inlet leg 44 of the junction conduit 38. The outlet leg 46 of the junction conduit 38 is coupled by a tube 48 to the inlet end 50 of a helical mixing coil 52. The outlet end 54 of the coil 52 is coupled by a tube 56 to the lower inlet end 58 of a vertically oriented flow cell 60. The upper outlet end 62 of the cell is coupled by a tube 64 to a suitable liquid sump 66.

A fixedly mounted light source 68 provides a constant intensity beam of light to a first light conducting means 70 which transmits the light beam to the flow cell 60. A second light conducting means 72 receives the beam of light after it has passed through the flow cell and projects the beam through a light filter 74 having a predetermined wave length pass to a fixedly mounted light intensity measuring device 76, here shown as a photo tube. The output of the measuring device 76 is coupled by a conductor 78 to a suitable recorder 80 which may be of the moving pen type. A switch 82, coupled to the means for rotating the carrier 10, may be provided to interrupt the conductor 78 between samples. An additional light beam collimator, not shown, and the light filter 74, may be positioned after the light source 68, if desired.

In operation, the rollers 28 progressively occlude the pump tubes 24 and 26 in the direction of the arrow A, developing a suction at the inlet ends of the liquid take-off tubes 14 and 18 respectively. When a sample cup 12 is positioned at the take-off position the linkage operates the rocker arm assembly 16 to lower the inlet end of the first take-off tube into this sample cup and concurrently, to lower the inlet end of the second take-off tube into the constant level well 20. Due to the suction provided by the pump, a quantity of sample liquid is aspirated by the first take-off tube from the cup and conveyed towards the junction conduit 38, and, concurrently, a quantity of reagent liquid is aspirated by the second take-off tube from the well and also conveyed towards the junction conduit. The volumetric rates of flow are determined by the inner diameters of the pump tubes, and the velocity of the rollers. The total volume of aspirated liquid, or length of liquid segment, is determined by the duration of the interval the take-off tubes are respectively disposed in the cup and the well. After a predetermined interval, the rocker arm assembly withdraws the take-off tubes from the cup and the well, after which a fresh sample cup is rotated to the take-off position by the carrier. While the take-off tubes are withdrawn from the cup and the well, the pump 22 has continued its operation, and thus during this withdrawn interval the take-off tubes pass air into the tubes towards the junction conduit 38. The length of these air segments is determined by the duration of the withdrawn interval. Thus each segment of sample liquid flowing towards the junction conduit will be spaced from the preceding and succeeding sample liquid segments by a segment of air. The reagent liquid segments flowing towards the junction conduit will also be separated by segments of air, and the lengths and phase of these segments in both tubes will be identical. If the linear distance between the inlet of the first take-off tube and the junction conduit is equal to the linear distance between the inlet of the second take-off tube, the segmented streams of sample and reagent liquid should arrive at the junction conduit in phase, and the resultant segmented stream of sample plus reagent liquids should also be in phase, assuming the internal diameters of the various tubes to be of suitable proportion. The resultant stream travels through the mixing tube wherein each segment of sample liquid is mixed and reacted with the in phase segment of reagent liquid to provide a color, the density of which is responsive to the quantity of an ingredient of interest in the sample liquid. The colored segment of treated liquid travels from the mixing coil, through the flow cell 60 and out to the liquid sump. Each segment of treated liquid, as it passes through the flow cell, is still separated from the preceding and succeeding segments by air segments.

With the exception of the pump tubes, which must be made of a resilient material such as polyvinyl chloride sold as "Tygon," the other elements, such as the take-off tubes, the coupling tubes, the junction conduit, the mixing coil and the flow cell may be made of a non-wetting material such as a fluorinated hydrocarbon, sold as "Teflon," to minimize or preclude the depositing of material from a sample liquid segment on the inner wall of these elements to contaminate a succeeding sample liquid segment. If desired, the linkages may be arranged so that the rocker assembly 16 inserts the take-off tube 14 twice or more times into each sample cup, to provide several segments of sample liquid, each separated by an air segment, for each sample cup provided by the carrier. In such a case the initial segments can be utilized to wash out the inner surface of the elements ahead of the final segment, which final segment may provide the measurement to be recorded and used.

The flow cell 60 is constructed of a thin walled inner tube 84 through which the liquid stream is passed, and an outer tube 86, which has a highly reflective inner surface which is in contact with the outer surface of the inner tube. A lower block 88 has a tubular hole 90 therein having an inner diameter equal to the outer diameter of inner tube 84. The inner tube is fitted into the hole 90 and the block is slidable along the axis of this tube. The inner surface may also be made highly reflective to serve as a light beam reflector. An upper block 92 is provided with a similar hole 94 and similarly slidably mounted on the inner tube 84. The outer tube 86 is disposed between the blocks. The first light conducting means 70 comprises a flexible bundle of light conducting fibers which is mounted in and projected beyond a diametrical hole 96 in a disk shaped element 100. The disk shaped element is disposed in a disk shaped recess 102 having a triangular extension 104 in the upper block 92. The projecting end of the bundle of fibers is thus pivotable in a plane which includes the axis B—B of the flow cell to vary the included angle between the exit axis of the bundle of fibers and the axis of the flow cell. The second light conducting means 72 similarly comprises a flexible bundle of light conducting fibers which is mounted in and projected beyond a diametrical hole 106 in a disk shaped element 108. The disk shaped element is similarly disposed in a disk shaped recess 110 having a triangular extension 112 in the lower block 28, and is similarly pivotable in a plane which includes the axis B—B of the flow cell and the exit axis of the bundle of fibers 72.

In operation, the bundle of light conducting fibers 70 serves to transmit a beam of light from the light source 68 diametrically through the translucent wall of the inner tube 84. The wall is made of as transparent a material and as thin as is possible to minimize the absorption of the beam of light passing therethrough. If the inner tube is made of glass the absorption will be minimal; if the tube is made of "Teflon" the absorption will be somewhat greater. The light beam passes through the liquid stream at an angle to the axis of the inner tube, passes through the far sidewall of the inner tube, and is reflected back by the highly reflective inner surface of the outer tube 86 or the block 92. Much of the beam is diffused by the liquid stream. The light conductors 70 and 72 are pivoted with respect to the axis B—B and the blocks 92 and 80 are adjustably spaced from each other so that the undiffused remainder of the light beam transmitted from the conductor 70, after making a desired number of reflected traverses of the inner tube, including any effect of refraction, will be axial with the inlet axis of the conductor 72, and will be received by the conductor 72 together with much of the diffused light from the light beam and will be transmitted through the filter 74 to the light intensity measuring device.

As seen in FIG. 2, the length of the liquid sample segment which is being measured should be equal to or greater than the axial length of the flow cell which is traversed by the light beam. The light beam may be kept on continuously while the input of recorder 80 may be turned on and off by the switch 82, operated by the carrier linkage in phase with the passage of the sample liquid segments through the flow cell. Alternatively, the input to the recorder may be left on continuously, and auxiliary means may be provided to detect the presence of a sample segment between the light beam inlet and outlet.

Any desired number of diametrical traverses of the tube by the light beam may be arranged. The reflector may be omitted and the ends of the bundles may be placed on opposite sides of the flow cell. Such a path will always be longer than the longitudinal axial length of the path, and will therefore provide a higher sensitivity to the measurement.

The vertical orientation and the smooth, continuous inner surface of the flow cell is effective to prevent the delay of attachment of air bubbles or liquid on the inner surface of the inner tube.

Flow cells of this type have been built having an inner tubing of either glass or non-wetting "Teflon" with an inner diameter of 2 to 3 millimeters, and having a longitudinal axial length of 5 to 50 millimeters.

In FIG. 5, a simplified form of a flow cell is shown. Three blocks 510, 512, and 514 each have a hole therethrough respectively, 516, 518 and 520, each hole having a common axis and diameter. The inner surfaces of these three holes are highly polished and act as reflectors. A length of "Teflon" tubing 522, having an outer diameter equal to the inner diameter of the holes 516, 518 and 520, is disposed through these holes, and forms the conduit for the liquid stream. An additional hole 524 is provided in the block 510, the hole 524 has an axis which intersects the axis of the hole 516, and includes an angle of less than 90° therewith. A similar hole 526 is provided in the block 514. An end of one bundle of light conducting fibers 528 may be fitted into the hole 524, while the end of another bundle of light conducting fibers 530 may be fitted into the hole 526. A pair of tension springs 532 are pinned between the blocks 510 and 514 (one spring only being shown), to hold the three blocks together. The central block 512 may be made of different lengths to adjust the spacing between the holes 516 and 520. To change the central block it is only necessary to remove the tube 522 from the hole 518, and to slide in a different block against the tension of the springs 532.

The flow cell of this invention may be advantageously utilized in the analysis apparatus disclosed in the application of Morris H. Shamus and William S. Smythe, S.N. 369,695, filed May 25, 1964, and assigned to the assignee of this application.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What I claim is:

1. A colorimeter for measuring the light transmittance characteristic of a liquid, comprising:

a tubular conduit for said liquid, having one end adapted for use as an inlet and the other end adapted for use as an outlet for the liquid as a stream;

at least a portion of said conduit having a substantially rectilinear longitudinal axis;

said conduit portion having at least a first portion of wall which is substantially light transparent and a second portion of wall which is substantially light transparent and spaced along said longitudinal axis;

a light source;

first means for transmitting light from said light source into said conduit portion along an axis through said first wall portion which is acute to said longitudinal axis;

a light detector;

second means for transmitting light to said light detector from said conduit portion along an axis through said second wall portion which is acute to said longitudinal axis;

means for varying the distance between said first and second light transmitting means along said longitudinal axis and for precluding the loss of light from said conduit portion between said first and second light transmitting means;

said first means for transmitting light includes an elongated first bundle of light conducting fibers having its light output end pivotally mounted to said conduit by a first collar member whereby the angle of the axis of said light output end to said longitudinal axis of said conduit may be adjusted in a common plane;

said second means for transmitting light includes an elongated second bundle of light conducting fibers having its light input end pivotally mounted to said conduit by a second collar member whereby the angle of the axis of said light input end to said longitudinal axis of said conduit may be adjusted in a common plane; and an additional tube having a light reflecting inner surface disposed on said conduit, and extending from and between said first and second collars.

2. A colorimeter for measuring the light transmittance characteristic of a liquid, comprising:

a substantially rectilinear length of light transparent tubing, for said liquid, having one end adapted for use as an inlet and the other end adapted for use as an outlet for the liquid as a stream, and having a substantially rectilinear longitudinal axis therebetween;

a light source;

first means including an elongated light conductor for transmitting light from said light source into said tubing along an axis through the wall of said tubing which is acute to said longitudinal axis, said conductor havng its light output end pivotally mounted to said tubing by a first collar member whereby the angle of the axis of said light output end to said longitudinal axis of said tubing may be adjusted in a common plane;

a light detector;

second means spaced along the tubing from said first means including a light conduit for transmitting light to said light detector from said tubing along an axis through the wall of said tubing which is acute to said longitudinal axis, said conductor having its light input end pivotally mounted to said tubing by a second collar member whereby the angle of the axis of said light input end to said longitudinal axis of said tubing may be adjusted in a common plane; and an additional tube disposed about said tubing from and between first and second collar members and having a light reflecting inner surface.

References Cited

UNITED STATES PATENTS

| 1,635,470 | 7/1927 | Exton | 88—14 |
| 1,644,330 | 10/1927 | Exton | 88—14 |
| 1,848,874 | 3/1932 | FitzGerald | 250—222 |
| 1,922,830 | 8/1933 | Staley | 88—14 |
| 2,317,024 | 4/1943 | Bliss | 88—14 |
| 2,407,838 | 9/1946 | Kliever | 88—14 |
| 2,420,716 | 5/1947 | Morton et al. | 250—227 |
| 2,646,880 | 7/1953 | Frankel | 88—14 |
| 3,114,283 | 12/1963 | Gruner | 88—14 |
| 3,305,689 | 2/1967 | Leavy et al. | 250—227 |
| 2,843,112 | 7/1958 | Miller | 88—14 |

FOREIGN PATENTS

| 97,440 | 2/1961 | Netherlands. |
| 151,063 | 6/1960 | U.S.S.R. |

JEWELL H. PEDERSEN, *Primary Examiner.*

WARREN A. SKLAR, *Assistant Examiner.*

U.S. Cl. X.R.

250—218; 356—246

UNITED STATES PATENT OFFICE
CERTIFICATE OF CORRECTION

Patent No. 3,418,053                          December 24, 1968

Milton H. Pelavin

It is certified that error appears in the above identified patent and that said Letters Patent are hereby corrected as shown below:

In the heading to the printed specification, line 4, "Technicon Instruments Corporation" should read -- Technicon Corporation --.

Signed and sealed this 17th day of March 1970.

(SEAL)
Attest:

Edward M. Fletcher, Jr.                    WILLIAM E. SCHUYLER, JR.

Attesting Officer                               Commissioner of Patents